United States Patent [19]
Kawabata et al.

[11] Patent Number: 5,631,512
[45] Date of Patent: May 20, 1997

[54] SYNCHRONOUS MOTOR HAVING MAGNETIC POLES OF PERMANENT MAGNET AND MAGNETIC POLES OF A SOFT MAGNETIC MATERIAL

[75] Inventors: Yasutomo Kawabata, Aichi-ken; Tetsuya Miura, Toyota, both of Japan

[73] Assignee: Toyota Jidosha Kabushiki Kaisha, Toyota, Japan

[21] Appl. No.: 409,597

[22] Filed: Mar. 24, 1995

[30] Foreign Application Priority Data

Apr. 13, 1994 [JP] Japan .................. 6-075121
Jan. 31, 1995 [JP] Japan .................. 7-014614

[51] Int. Cl.$^6$ ............................... H02K 21/12
[52] U.S. Cl. ............................... 310/156
[58] Field of Search ............... 310/156, 154, 310/258, 261

[56] References Cited

U.S. PATENT DOCUMENTS

| | | | |
|---|---|---|---|
| 2,060,260 | 6/1936 | Spengler | 310/156 |
| 3,467,844 | 9/1969 | Bird | 310/156 |
| 4,354,126 | 10/1982 | Yates | 310/156 |
| 4,471,252 | 9/1984 | West | 310/154 |
| 4,631,435 | 12/1986 | McCarty | 310/156 |
| 4,661,736 | 4/1987 | Kawada et al. | 310/162 |
| 4,691,132 | 9/1987 | Bertram et al. | 310/156 |
| 4,700,096 | 10/1987 | Epars | 310/153 |
| 4,700,097 | 10/1987 | Kawada et al. | 310/162 |
| 4,709,179 | 11/1987 | Banon et al. | 310/156 |
| 5,013,951 | 5/1991 | Stadnik et al. | 310/156 |
| 5,038,065 | 8/1991 | Matsubayashi et al. | 310/156 |
| 5,047,680 | 9/1991 | Torok | 310/156 |

FOREIGN PATENT DOCUMENTS

| | | | |
|---|---|---|---|
| 60-121949 | 6/1985 | Japan . | |
| A-60-121949 | 6/1985 | Japan . | |
| A-2-202329 | 8/1990 | Japan . | |
| 2-202329 | 8/1990 | Japan . | |
| A-5-307312 | 11/1993 | Japan . | 310/156 |

*Primary Examiner*—Steven L. Stephan
*Assistant Examiner*—Michael Wallace, Jr.
*Attorney, Agent, or Firm*—Oliff & Berridge

[57] ABSTRACT

Hard magnetic poles made of a permanent magnet and soft magnetic poles are alternately disposed on the periphery of a cylindrical rotor of a permanent magnet type synchronous motor. The arcuate length of the hard magnetic poles is equal to that of the intervals between the hard magnetic poles, thereby enabling an increase in the ratio of reluctance torque. Therefore, the number of permanent magnets used can be reduced, making production economical, and a back electromotive force can also be lowered. Further, one magnetic pole consists of six slots, and the arcuate length of hard and soft magnetic poles corresponds to a 3-slot pitch, thereby enabling a reduction in cogging torque.

12 Claims, 8 Drawing Sheets

SYNCHRONOUS MOTOR HAVING MAGNETIC POLES OF PERMANENT MAGNET AND MAGNETIC POLES OF A SOFT MAGNETIC MATERIAL

BACKGROUND OF THE INVENTION

1. Field of the Invention

This invention relates to a permanent magnet type synchronous motor having magnetic poles of a permanent magnet arranged on a rotor and having magnetic poles of a soft magnetic material which are alternately arranged with the magnetic poles of the permanent magnet, and particularly to the arrangement of the above two types of magnetic poles and their sizes.

2. Description of the Prior Art

Today, permanent magnet type synchronous motors, which have magnetic poles of a permanent magnet on a rotor and use a rotating magnetic field generated by a stator to rotate the rotor, are used in various fields. Such permanent magnet type synchronous motors are superior to an induction motor which has a winding on its rotor in enabling an increase in magnetic flux density per unit volume, thereby reducing the outside dimensions of the motors.

However, a hard magnetic material for use as a permanent magnet is generally expensive, and therefore, it is desired to use the hard magnetic material in a small quantity. In view of the circumstances, a rotor 1 having the cross section shown in FIG. 1 may be used. The rotor 1 has four permanent magnets on the outer wall of a rotor body 2 which is made of a hard magnetic material. These permanent magnets form hard magnetic poles 3. Between these adjacent hard magnetic poles 3, a magnetic pole 4 (hereinafter referred to as the soft magnetic pole) made of a soft magnetic material and being integral with the rotor body 2 is disposed. These soft magnetic poles 4 are made of the same soft magnetic material as used for the rotor. The hard magnetic poles 3 and the soft magnetic poles 4 have the same thickness radially, and are alternately arranged in the circumferential direction of the rotor 1. Hence, the rotor 1 has a cylindrical appearance.

Also, in a case of an ordinary 3-phase motor which has three slots per pole, arcuate lengths of the hard magnetic poles in the circumferential direction are about two times the slot pitch of a stator, and arcuate lengths of the soft magnetic pole are equal to the slot pitch.

A motor having the above rotor 1 generates torque with the hard magnetic poles 3 attracted by a rotating magnetic field generated by the stator and torque with the soft magnetic poles 4 attracted by the above rotating magnetic field. Therefore, this motor can generate greater torque compared with a motor using a rotor which disposes hard magnetic poles only on the outer wall of a cylindrical rotor without disposing the soft magnetic poles.

On the other hand, in the permanent magnet type synchronous motor, a back electromotive force is generated within the stator coil by rotation of permanent magnets. This phenomenon occurs in the motor having the soft magnetic poles 4 as shown in FIG. 1 and also in a motor without them. The back electromotive force increases as the motor rotates faster. When the back electromotive force becomes equal to the power voltage, the rotation cannot be further increased. Therefore, in order to obtain a faster rotation by means of the permanent magnet type synchronous motor, the stator is controlled to generate a magnetic field which counteracts the magnetic field of the above permanent magnet. This control is generally called a field-weakening control.

For the above permanent magnet type synchronous motor, its rotation torque may be increased by increasing the quantity of the permanent magnets to enhance a magnetic flux. However, it has a disadvantage that a motor cost is increased when quantity of the hard magnetic material is increased because the hard magnetic material for the permanent magnets is generally expensive as described above. Besides, there are disadvantages that the enhanced magnetic flux increases a voltage of the back electromotive force and lowers the upper limit of the rotating speed when the field-weakening control is not conducted. Also, when the quantity of the hard magnetic material is increased and the field-weakening control is required, the control range is increased and the power consumption is also increased. Besides, when a failure in a control circuit during the field-weakening control suspends the field control, there is a problem that the voltage of the back electromotive force exceeds a withstand voltage of the power circuit, causing a damage in the circuit.

SUMMARY OF THE INVENTION

This invention has been completed to remedy the above problems, and aims to provide a permanent magnet type synchronous motor which limits the quantity of permanent magnets for a rotor and can increase the top rotating speed even when field-weakening control is not conducted.

To accomplish the above object, the permanent magnet type synchronous motor has a plurality of hard magnetic poles made of permanent magnets which are arranged at equal intervals with an arcuate length of the hard magnetic poles in the circumferential direction of the motor rotor, and a plurality of soft magnetic poles made of a soft magnetic material which are at least partly disposed circumferentially among the above plurality of hard magnetic poles. Thus, the quantity of permanent magnets used can be reduced while securing torque generated by the motor. Further, the reduction in the number of permanent magnets used can lower the generation of the back electromotive force.

In addition, in the above permanent magnet type synchronous motor, the arcuate length of the soft magnetic poles can be made substantially equal to that of the hard magnetic poles. In this case, the torque generated by the soft magnetic poles becomes maximum, allowing the motor to generate maximum torque.

Furthermore, the plurality of hard magnetic poles and the plurality of soft magnetic poles may have the same thickness in the radial direction of the rotor. In this case, the rotor can have a substantially cylindrical appearance, making it possible to reduce uneven spots on the outer wall. Thus, loss and noise due to air resistance generated when the rotor rotates can be reduced.

Further, the arcuate length of the hard magnetic poles may be made substantially equal to a length an integral multiple of 3 times the slot pitch of the motor stator. In this case, the number of slots opposed to the hard magnetic poles is always an integral multiple of 3 regardless of the rotational shift between the stator and the rotor. Thus, fluctuation variations in the rotation torque can be reduced.

In the above permanent magnet type synchronous motors, when the hard magnetic poles and the soft magnetic poles have different arcuate lengths, the above plurality of soft magnetic poles can be disposed displaced backward in the direction of rotation of the rotor among the plurality of magnetic poles. In this case, the front portion in the direction of rotation where the magnetic flux varies heavily within the soft magnetic poles can be placed away from the hard magnetic poles to prevent the hard magnetic poles from incurring a temperature increase and a torque ripple.

DESCRIPTION OF THE PREFERRED EMBODIMENTS

Preferred embodiments of this invention will be described with reference to the drawings.

Figure 1:
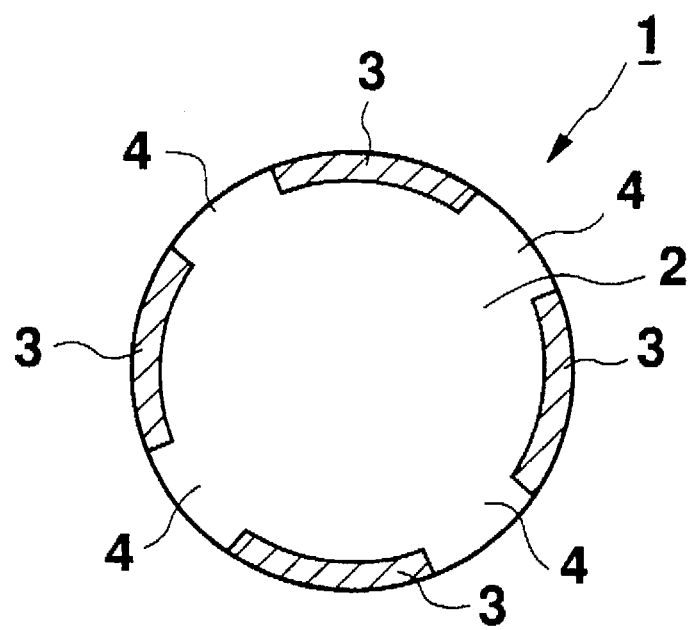
FIG. 1 Is a sectional view of the rotor of a permanent magnet type synchronous motor, and particularly a cross section of the rotor having salient poles.
Figure 2:
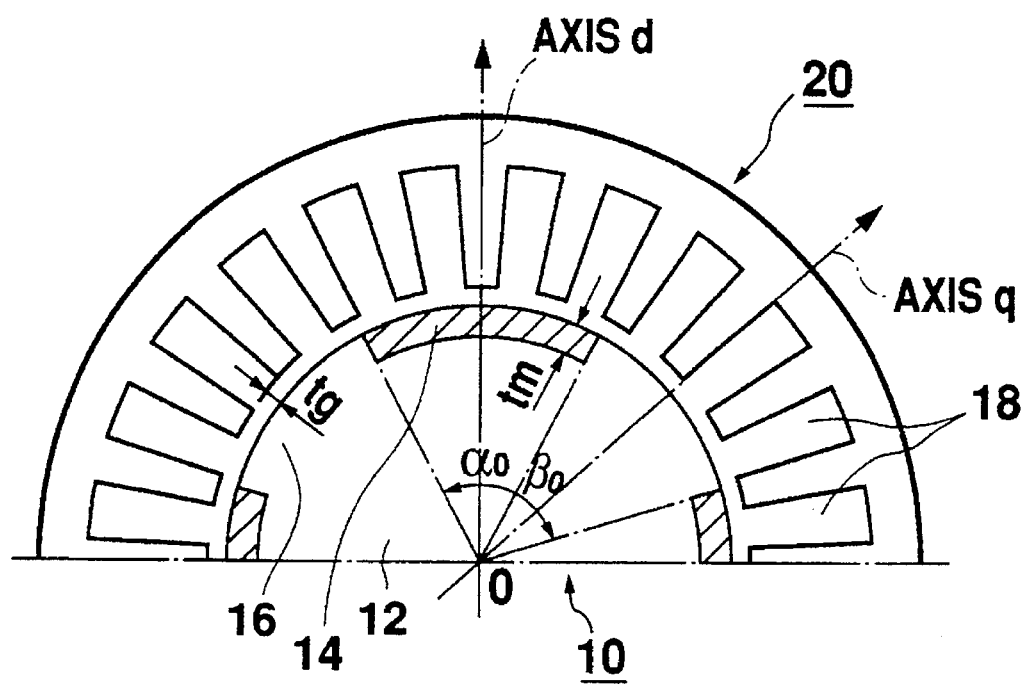
FIG. 2 is a view for illustrating the principle of this invention, showing a sectional view of its motor.

FIG. 2 shows an explanatory view of the principle of this invention. FIG. 2 shows the top cross section of a motor. A rotor 10 includes a rotor body 12, and hard magnetic poles 14 made of permanent magnets and soft magnetic poles 16 made of soft magnetic material which are alternately disposed on the periphery of the rotor body 12. The entire rotor 10 has a cylindrical shape, and its side wall is substantially uniform without unevenness. The hard magnetic poles 14 arcuately disposed on the periphery of the rotor 10 have an angle of $\alpha_o$ with respect to the center O of the rotor 10, and the hard magnetic poles 14 have a thickness $t_m$ in the radial direction of the rotor. The soft magnetic poles 16 have an angle of $\beta_o$ with respect to the center O of the rotor 10.

A stator 20 having a plurality of slots 18 is disposed around the rotor 10. A gap between the end of each slot and the rotor 10 is $t_g$. The drawing shows an axis d which is a virtual axis passing through the center of the hard magnetic pole and an axis q which is a virtual axis passing through the center of the soft magnetic pole.

Motor torque T generated in the above motor is represented by the following expression:

$$T = p\Phi m\ I\ \cos\theta + p(L_q - L_d)I^2 \sin 2\theta \quad (1)$$

where, T is a motor torque, I is a motor current, $\Phi_m$ is a magnetic flux of the magnet, P is a current phase, $\theta$ is a pole logarithm, $L_d$ is an axis d inductance, and $L_q$ is an axis q inductance.

In the expression (1), the first term indicates torque generated when the permanent magnets for the hard magnetic poles interact with the rotating magnetic field, and the second term indicates reluctance torque generated due to a difference between the hard and soft magnetic pole inductances. In order to increase the motor torque T with a current quantity kept constant, it is known to increase the magnetic flux of the magnet (p$\Phi$m) of the entire rotor. When this is effected, however, a back electromotive force is increased as described above, resulting in problems that the field-weakening control is required in lower rotating speed. Further, in order to increase the magnetic flux of the magnet $\Phi_m$, a larger magnet is used and a hard magnetic material having higher magnetism is selected, but these choices involve a hike in costs. Therefore, it is preferable to increase the reluctance torque of the second term.

To increase the reluctance torque, it is necessary to increase the ($L_q$–$L_d$). Inductance is inversely proportional to the gap between the stator and the soft magnetic substance of the rotor. Namely, the inductance $L_d$ of the axis d is inversely proportional to the sum ($t_m$ +$t_g$) of the thickness of the permanent magnet and the gap between the rotor and the stator, and the inductance $L_q$ of the axis q is inversely proportional to the gap $t_g$. Therefore, it is seen that the increase of the thickness of the permanent magnet $t_m$ results in Increasing ($L_q$–$L_d$), but this also increases the quantity of permanent magnets, resulting in increasing costs.

In view of the above, attention is focused on a difference between a magnetic flux $\Phi_d$ generated at the hard magnetic pole 14 portion (axis d) and a magnetic flux $\Phi_q$ generated at the soft magnetic pole 16 portion (axis q). In other words, since these magnetic fluxes $\Phi_d$, $\Phi_q$ are each proportional to the inductances $L_d$, $L_q$, attention is given to the fact that the larger the difference of these magnetic fluxes ($\Phi_q$–$\Phi_d$) becomes, the larger the ($L_q$–$L_d$ ) becomes. This will be described in more detail.

Figure 3:
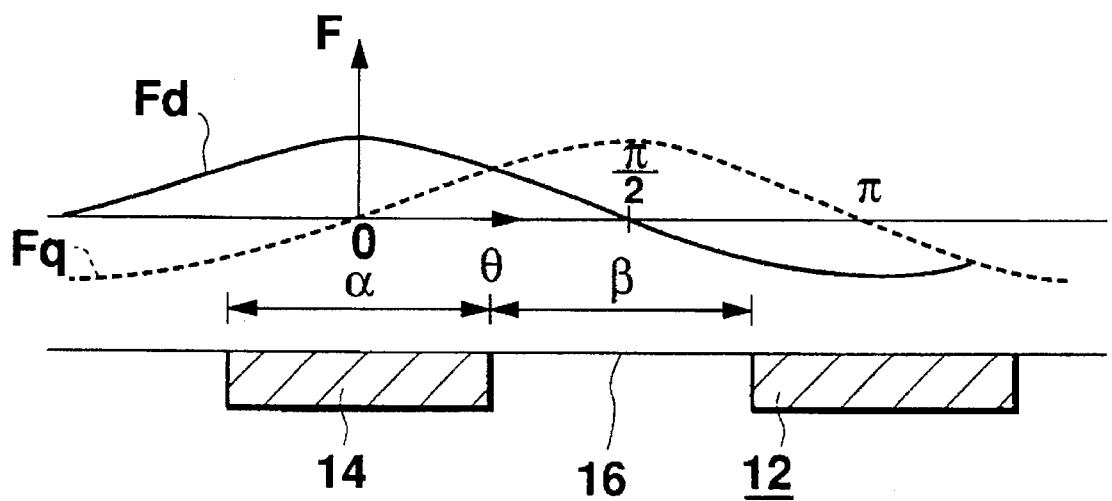
FIG. 3 is a view for illustrating the principle of this invention, showing its rotor expanded together with field magnets.

FIG. 3 shows a development of the rotor 10 of FIG. 2. The drawing shows the hard magnetic pole 14 having a width $\beta$ in an electrical angle and the soft magnetic pole 16 having a width $\alpha$ in an electrical angle. Here, $\alpha$+$\beta$=$\pi$. When the axis d current $I_d$ and the axis q current $I_q$ whose phases are displaced by $\pi/2$ are passed through the stator 20, electromotive forces generated are the axis d magnetomotive force $F_d$ and the axis q magnetomotive force $F_q$ respectively. The magnetic fluxes generated due to the above magnetomotive forces correspond to the above magnetic fluxes $\Phi_d$, $\Phi_q$. Reactance is a coefficient to indicate the ease of occurrence of a magnetic flux when a current is passed through. It can be represented by the following expression (2):

$$L_d = \frac{N\Phi_d}{I_d}\ ,\ L_q = \frac{N\Phi_q}{I_q} \quad (2)$$

where, when the axis d current $I_d$ and the axis q current $I_q$ have an equal amplitude, ($L_q$–$L_d$) becomes large as the difference of these magnetic fluxes ($\Phi_q$–$\Phi_d$) increases. Here, when it is assumed that the magnetomotive forces of a small portion d$\theta$ of an electrical angle $\theta$ are $F_d(\theta)$, $F_q(\theta)$, a magnetic resistance of the magnet is $R_{md}$, and a magnetic resistance at the salient portion is $R_{mq}$, the following expressions (3), (4) are derived.

$$\begin{cases} \Phi_d = 2\int_0^{\frac{\alpha}{2}} \frac{F_d(\theta)}{R_{md}}\ d\theta + 2\int_{\frac{\alpha}{2}}^{\frac{\pi}{2}} \frac{F_d(\theta)}{R_{mq}}\ d\theta & (3) \\[2ex] \Phi_q = 2\int_0^{\frac{\alpha}{2}} \frac{F_q(\theta)}{R_{md}}\ d\theta + 2\int_{\frac{\alpha}{2}}^{\frac{\pi}{2}} \frac{F_q(\theta)}{R_{mq}}\ d\theta & (4) \end{cases}$$

When the electromotive forces $F_d$, $F_q$ are assumed to be as follows:

$$F_d(\theta) = F \cos\theta,\ F_q F \sin\theta$$

to solve the expressions (3), (4), the following expressions (5), (6) are derived.

$$\Phi_d = 2 \left( \frac{\sin\frac{\alpha}{2}}{R_{md}} + \frac{1-\sin\frac{\alpha}{2}}{R_{mq}} \right) \quad (5)$$

$$\Phi_q = 2 \left( \frac{1-\cos\frac{\alpha}{2}}{R_{md}} + \frac{1-\cos\frac{\alpha}{2}}{R_{mq}} \right) \quad (6)$$

Further, the difference of the magnetic fluxes $(\Phi_q - \Phi_d)$ is expressed by the following expression (7):

$$\Phi_q - \Phi_d = 2 \left( \frac{1}{R_{mq}} - \frac{1}{R_{md}} \right) \left( \cos\frac{\alpha}{2} + \sin\frac{\alpha}{2} - 1 \right) \quad (7)$$

The $\alpha$ which makes the expression (7) maximum is $\pi/2$. Therefore, the $\beta$ is also $\pi/2$. Also, when the hard magnetic pole and the soft magnetic pole are designed to have the same width, maximum reluctance torque can be obtained.

Incidentally, the permanent magnet motor has its output torque fluctuate, regardless of the coil current, due to the positional relationship between the hard magnetic poles and the rotating stator core, generating a so-called cogging torque. As a method of reducing the cogging torque, Japanese Patent Application Laid-open Print No. 2-202329 discloses a motor whose permanent magnets have an arcuate length substantially equal to a length of an integral multiple of the stator slot pitch. More specifically, it is designed that the stator has three slots per magnetic pole, the arcuate length of the hard magnetic poles is substantially equal to two slots, and the soft magnetic poles are substantially equal to one slot, thereby meeting the condition that the arcuate length of each magnetic pole is equal to a length of an integral multiple of the slot length.

Figure 4:
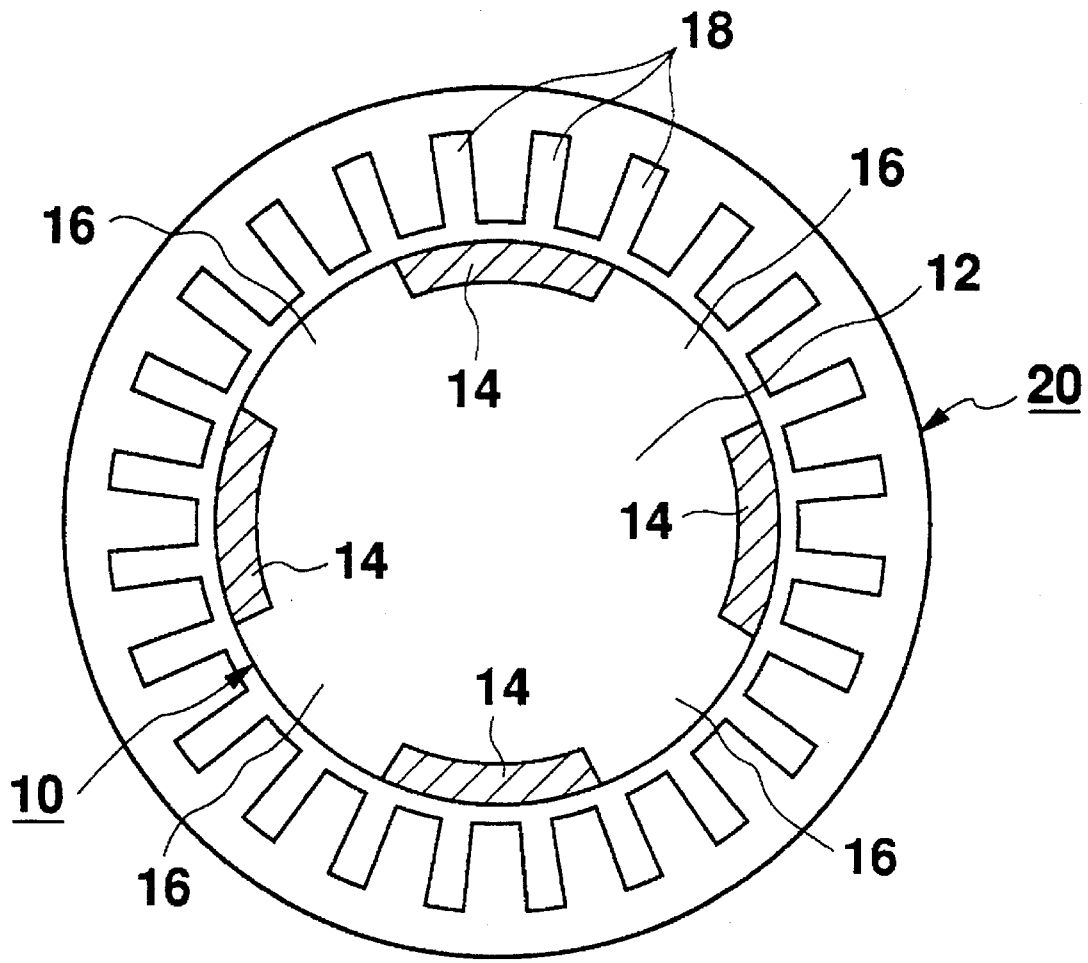
FIG. 4 is a sectional view of the permanent magnet type synchronous motor of this embodiment.

As described above, however, to provide the maximum reluctance torque, it is desirable to determine a ratio of the arcuate lengths of the hard and soft magnetic poles to be 1:1. Therefore, in the embodiment shown in FIG. 4, the number of slots per magnetic pole is six and the arcuate lengths of the hard and soft magnetic poles each are equal to three slots. The embodiment shown in FIG. 4 shows a 4-pole motor where four hard magnetic poles 14 and four soft magnetic poles 16 are alternately disposed. The hard magnetic poles 14 and the soft magnetic poles 16 each have an arcuate length equal to ⅛ of the perimeter of the rotor 10. The stator 20 has 24 slots 18, providing 6 slots per magnetic pole. Therefore, a 3-slot pitch corresponds to the arcuate lengths of the hard and soft magnetic poles 14, 16. Thus, the structure of the motor shown in FIG. 4 allows the hard and soft magnetic poles 14, 16 to have the same arcuate length which is substantially equal to an integral multiple of the slot pitch. Consequently, the reluctance torque of the second term in the expression (1) can be made maximum, and the ratio of the magnets of the first term can be reduced accordingly.

As a result, the back electromotive force can be reduced accordingly, and the rotating speed requiring the field-weakening control can be increased. In the case of a failure in a control circuit under the field-weakening control, a voltage applied to the control circuit can be reduced by virtue of the small back electromotive force.

The above description was directed to the structure in which one magnetic pole is made of six slots and the arcuate lengths of the hard and soft magnetic poles are substantially equal to a 3-slot pitch. However, the same effect can be attained when the number of the slots is increased to an integral multiple of the above, namely 6n slots per magnetic pole, and the arcuate lengths of the permanent magnets and the salient poles are equal to the 3n-slot pitch.

Figure 5:
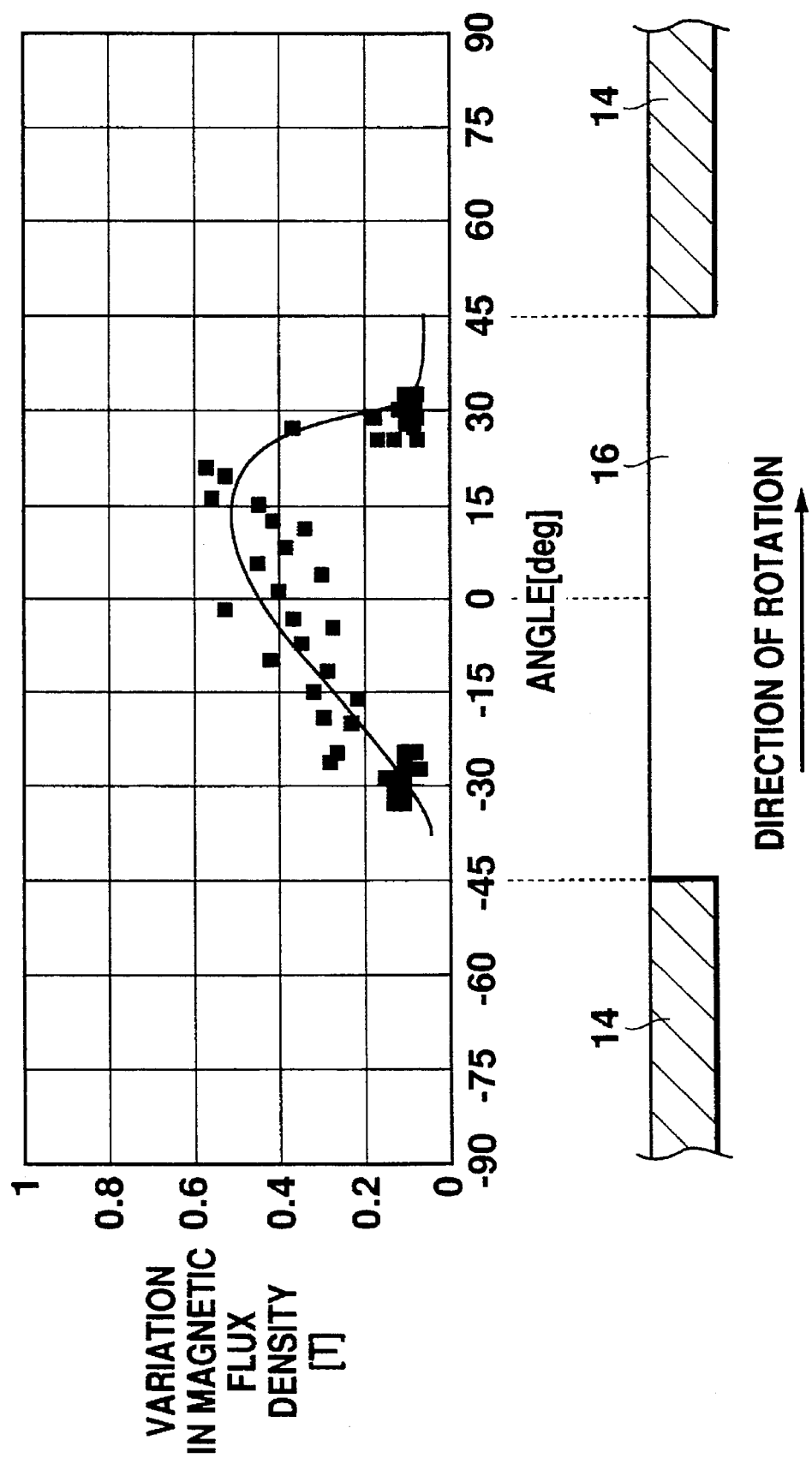
FIG. 5 is a diagram showing variations in magnetic flux density at each portion of the salient poles in the embodiment shown in FIG. 3.

FIG. 5 is a graph showing a simulation result of the variations in the magnetic flux density at each point in the soft magnetic poles 16 of the embodiment shown in FIG. 4. It is seen from the graph that the magnetic flux density varies sharply at the front in the direction of rotation of the soft magnetic pole 16. Therefore, a hysteresis loss at the front of the soft magnetic pole 16 is significant, leading to a high heat generation. This heat generation, which takes place near the hard magnetic pole 14 at the front of the salient pole, raises the temperature of the permanent magnet which is the hard magnetic pole 14. Generally, the permanent magnet tends to lose its magnetism when its temperature is increased, and the magnetism, once lowered due to the temperature increase, is not restored to its original magnetism even if its temperature is lowered to a normal temperature. Therefore, the permanent magnet is preferably kept away from any exothermic sources. Further, heavy variations in the magnetic flux density cause a torque ripple, sometimes failing to make the generated torque satisfactorily smooth.

Figure 6:
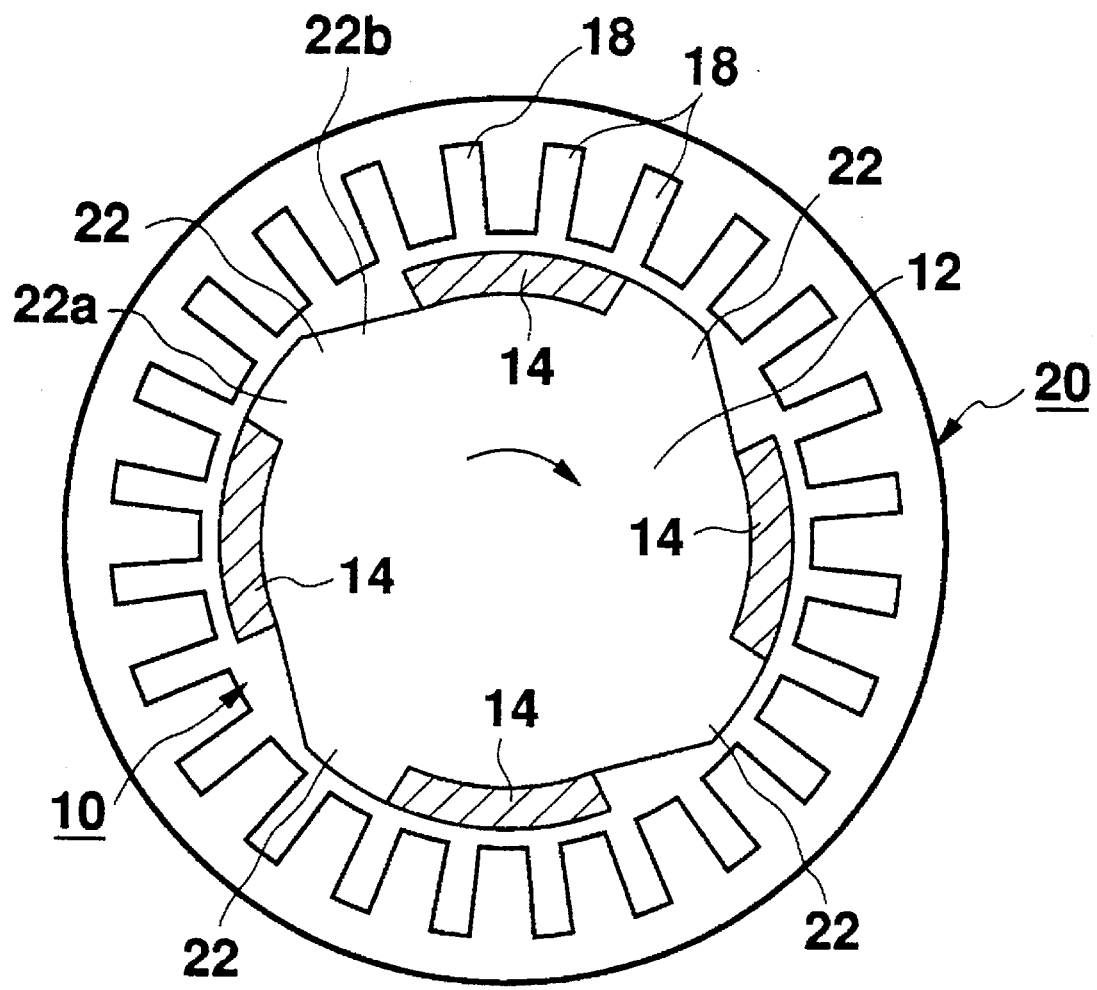
FIG. 6 is a view showing another embodiment of this invention.
Figure 7:
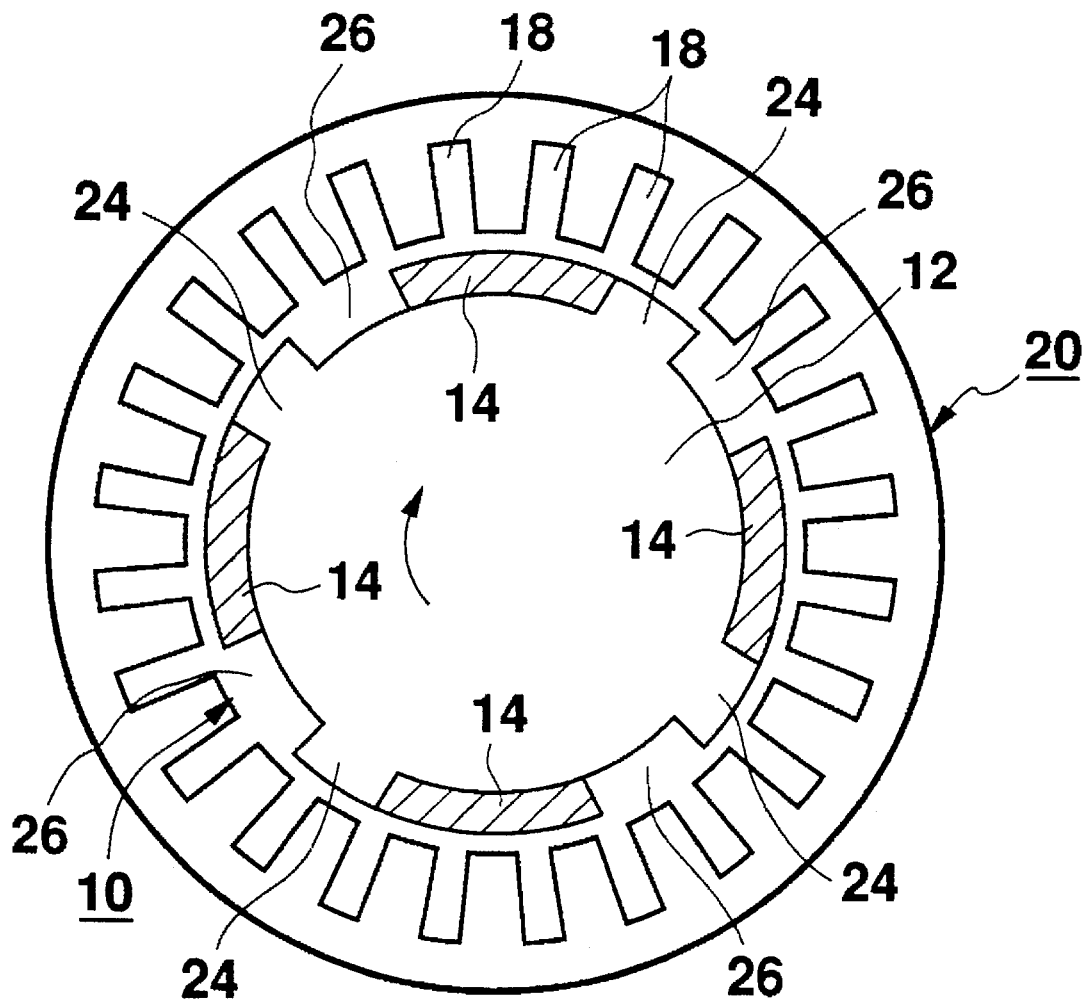
FIG. 7 is a view showing still another embodiment of this invention.
Figure 8:
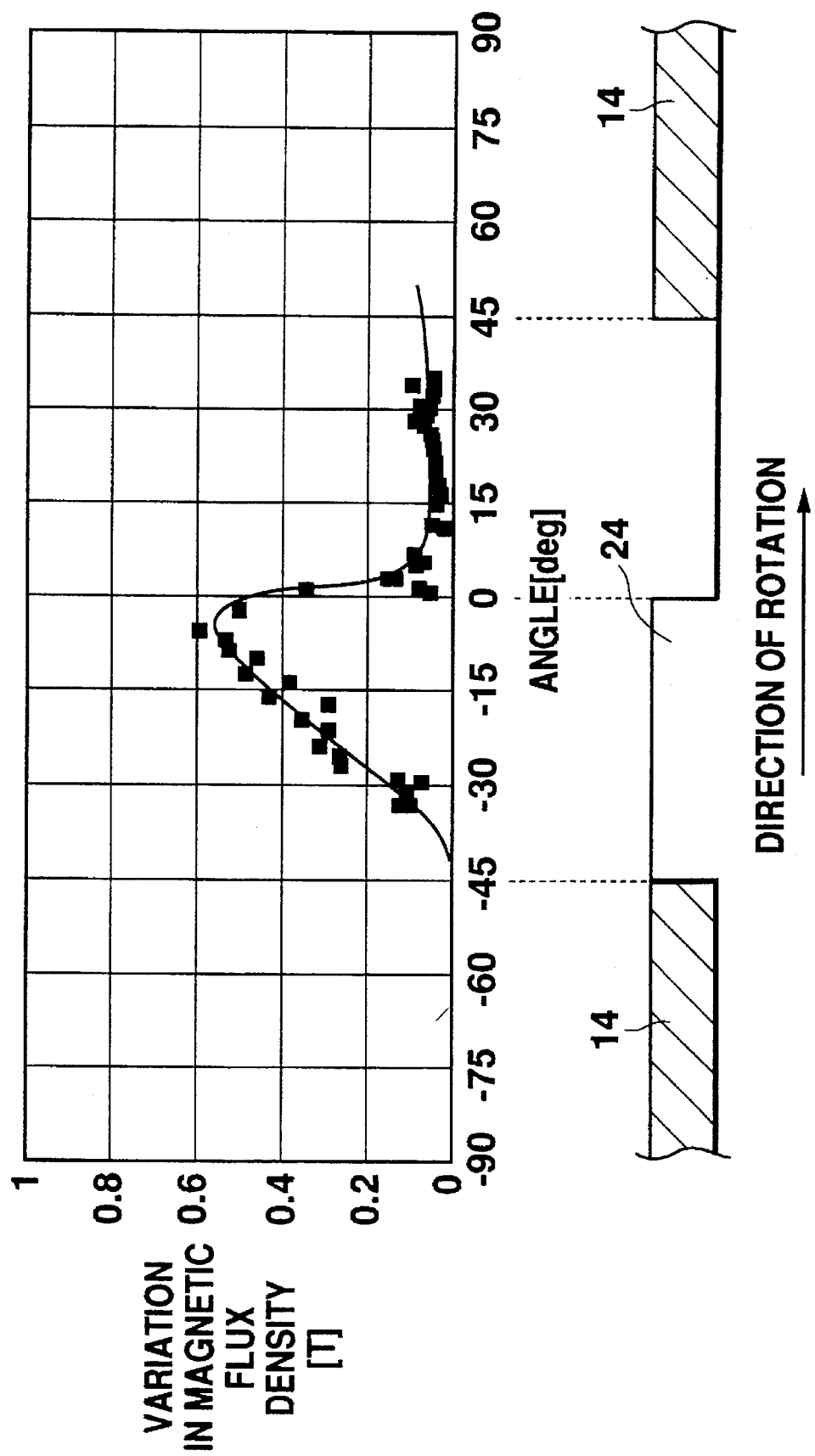
FIG. 8 is a diagram showing variations in magnetic flux density at each portion of the salient poles in the embodiment shown in FIG. 6.

In view of the above variations in the magnetic flux density, the embodiments of FIG. 6 and FIG. 7 do not dispose the soft magnetic poles at positions where the magnetic flux density of the soft magnetic poles varies extensively, namely the front in the direction of rotation of the rotor, but dispose them at the back positions. For the same components as those used in the embodiment of FIG. 4, the same reference numerals are used and their description will be omitted.

FIG. 6 shows a permanent magnet motor having soft magnetic poles 22 which have sections 22a having the same thickness as the hard magnetic poles 14, at the back in the direction of rotation of the rotor. At the front in the direction of rotation of the rotor, slanted sections 22b having a nearly triangle cross section are disposed to smoothly joining the protruded face of the section 22a with the bottom of the hard magnetic pole positioned toward the front. In this case, the permanent magnets for the hard magnetic poles are securely positioned by being held between the section 22a and the slanted section 22b.

FIG. 7 shows a permanent magnet type synchronous motor having soft magnetic poles 24 which have the same thickness as the hard magnetic poles 14, at the back of the direction of rotation of the rotor, and spaces 26 having the same thickness as the hard magnetic poles 14 toward the front.

The embodiments of FIG. 6 and FIG. 7 show the forms obtained by eliminating the sections, which cause extensive variations in the magnetic flux density, from the embodiment shown in FIG. 4, thereby enabling to reduce a heating value and a torque ripple. Japanese Patent Application No. 5-307312 by the same applicant describes that the soft magnetic poles better contribute to the generation of torque by their back portions in the direction of rotation of the rotor. And, since the embodiments of FIG. 6 and FIG. 7 dispose the soft magnetic poles at the back portions, the effect of the torque increase by the soft magnetic poles is not greatly deteriorated as compared with the embodiment shown in FIG. 3. Also, the embodiments shown in FIG. 6 and FIG. 7 also have the other effects of the embodiment shown in FIG. 3.

Figure 9:
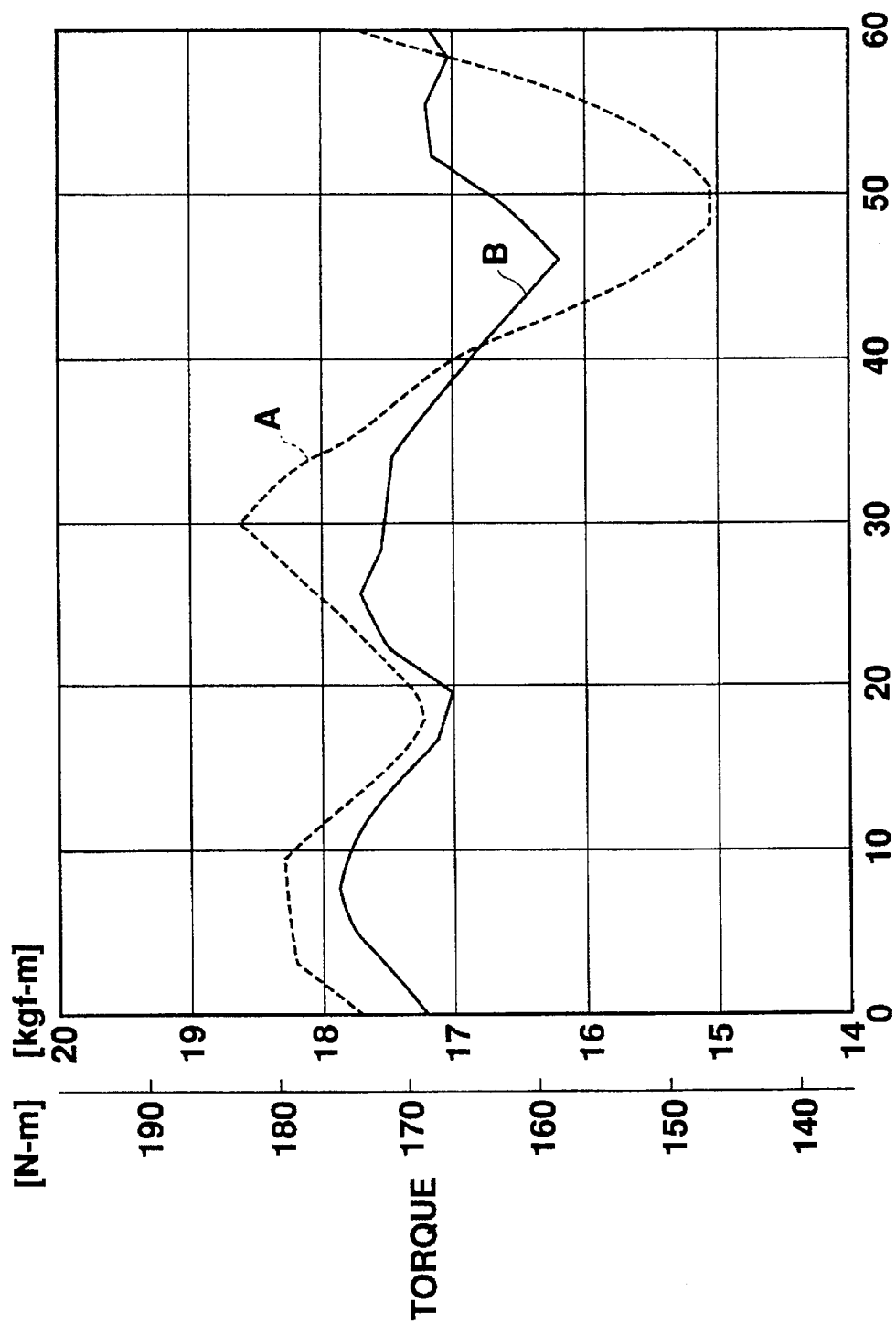
FIG. 9 is a graph showing the variations in torque for each of the embodiments shown in FIG. 3 and FIG. 6.

FIG. 9 is a graph showing curves A and B which indicate the generated torques in the embodiments of FIG. 4 and FIG. 7 respectively. It is seen that the torque curve B of the embodiment of FIG. 7 shows smaller variations In the torque (torque ripple) than the torque curve A of the embodiment of FIG. 4.

As described above, the soft magnetic poles are not entirely disposed among the hard magnetic poles 14 but partly disposed, thereby enabling reduction of the heat generation and lowering of the torque ripple. Particularly, when the soft magnetic poles are disposed at the back portion in the direction of rotation of the rotor, the above effect can be obtained without extensively deteriorating the torque increase which is obtained by disposing the soft magnetic poles.

The above description has been mainly directed to the embodiment in which the soft magnetic poles are disposed at the back half. Also, the size and shape of the soft magnetic poles are required to be determined according to the performance of the motor actually required, namely generated torque, smoothness of the generated torque, and a limit of heating value required in view of the cooling performance of the motor. For example, when cooling can be fully effected and the torque smoothness is not so severely required, the size can be made large, as shown in the embodiment of FIG. 4. Further, when the motor has a high heating value and the motor-located position has a high temperature which can not be cooled down sufficiently, it is preferable that the salient poles are made compact and disposed displaced backward.

As described above, according to the above embodiments, the hard magnetic poles and the soft magnetic poles have the same length In the peripheral direction and the arcuate lengths of the magnetic poles are substantially equal to a pitch of an integral multiple of 3 of the stator slots, so that the variations in the rotating torque, which are generated when the ends of the hard magnetic poles pass by the ends of the slots, can be reduced.

Further, the arcuate lengths of the hard magnetic poles and those of the intervals of the hard magnetic poles are made equal, and the soft magnetic poles are at least partly disposed in the intervals among the hard magnetic poles, so that the number of permanent magnets used can be reduced while securing the generation of torque, and the back electromotive force can also be lowered.

The same length of the hard and soft magnetic poles in the circumferential direction makes it possible to increase torque (reluctance torque) generated at the soft magnetic poles and to reduce the ratio of the torque due to the magnets to the entire torque generated. Therefore, number of the permanent magnets used can be reduced, and the back electromotive force generated can also be lowered.

Furthermore, the soft magnetic poles can be disposed at the back Instead of the front in the direction of rotation of the rotor among the hard magnetic poles, to reduce the variations in the magnetic flux of the soft magnetic poles, thereby making it possible to reduce the torque ripple and to suppress the temperature of the permanent magnets from rising.

What is claimed is:

1. A permanent magnet type synchronous motor, comprising:
   a stator having a bore extending longitudinally therethrough; and
   a substantially cylindrical rotor sized and adapted for rotational movement within said bore and having an outer peripheral surface comprising:
      a plurality of hard magnetic poles fabricated from a permanent magnet material with each hard magnetic pole having a uniform arcuate length; and
      a plurality of soft magnetic poles fabricated from a soft magnetic material whereby adjacent ones of said hard magnetic poles are spaced apart from one another at intervals substantially equal to the arcuate length of said hard magnetic poles with a respective one of said soft magnetic poles disposed between said adjacent ones of said hard magnet poles in a manner to abut a respective one of said hard magnetic poles and to define a space between said respective one of said soft magnetic poles and a consecutive one of said hard magnetic poles.

2. A permanent magnet type synchronous motor according to claim 1, wherein said hard and soft magnetic poles have substantially the same arcuate length.

3. A permanent magnet type synchronous motor according to claim 2, wherein said plurality of hard magnetic poles and said plurality of soft magnetic poles have the same thickness in the radial direction of the rotor.

4. A permanent magnet type synchronous motor according to claim 1, wherein said arcuate length of the hard magnetic poles is substantially equal to that of an integral multiple of 3 times the slot pitch of the motor stator.

5. A permanent magnet type synchronous motor according to claim 4, wherein said hard and soft magnetic poles have substantially the same arcuate length.

6. A permanent magnet type synchronous motor according to claim 5, wherein said plurality of hard magnetic poles and said plurality of soft magnetic poles have the same thickness in the radial direction of the rotor.

7. A permanent magnet type synchronous motor according to claim 4, wherein said plurality of soft magnetic poles are disposed backward in the direction of rotation of the rotor and between the plurality of hard magnetic poles.

8. A permanent magnet type synchronous motor according to claim 1, wherein said plurality of soft magnetic poles are disposed backward in the direction of rotation of the rotor between the plurality of hard magnetic poles.

9. A permanent magnet type synchronous motor according to claim 1, wherein the arcuate length of the hard magnetic poles are substantially equal to ⅛ of the perimeter of the motor rotor.

10. A permanent magnet type synchronous motor according to claim 1, wherein the arcuate length of the hard and soft magnetic poles is substantially equal to an integral multiple of the slot pitch.

11. A permanent magnet type synchronous motor according to claim 1, wherein said spaces have the same thickness as the plurality of hard magnetic poles in the radial direction of the rotor.

12. A permanent magnet type synchronous motor, comprising:
    a stator having a bore extending longitudinally therethrough; and
    a substantially cylindrical rotor sized and adapted for rotational movement within said bore and having an outer peripheral surface comprising:
       a plurality of hard magnetic poles fabricated from a permanent magnet material with each hard magnetic pole having a uniform arcuate length relative to a rotational axis of said rotor and a uniform thickness measured radially from said rotational axis and toward said outer peripheral surface; and
       a plurality of soft magnetic poles fabricated from a soft magnetic material whereby adjacent ones of said hard magnetic poles are spaced apart from one another at intervals substantially equal to the arcuate length of said hard magnetic poles with a respective one of said soft magnetic poles disposed between said adjacent ones of said hard magnet poles in a manner to abut a respective one of said hard magnetic poles and to define a space between said respective one of said soft magnetic poles and a consecutive one of said hard magnetic poles, said space having a depth relative to said outer peripheral surface in a direction toward said rotational axis substantially equal to said thickness of said plurality of hard magnetic poles.

* * * * *